United States Patent [19]

Starkweather et al.

[11] 3,867,571

[45] Feb. 18, 1975

[54] FLYING SPOT SCANNER

[75] Inventors: Gary K. Starkweather, Saratoga; David E. Damouth, Menlo Park, both of Calif.

[73] Assignee: Xerox Corporation, Stamford, Conn.

[22] Filed: Nov. 27, 1972

[21] Appl. No.: 309,861

[52] U.S. Cl. ............ 178/7.6, 178/DIG. 27, 350/285

[51] Int. Cl. ............................................ H04n 1/02

[58] Field of Search ....... 178/7.6, 7.7, 7.1, DIG. 27; 350/7, 285, 99

[56] References Cited

UNITED STATES PATENTS

| | | | |
|---|---|---|---|
| 3,573,849 | 4/1971 | Herriot et al. | 346/108 |
| 3,701,999 | 10/1972 | Congleton et al. | 346/76 L |

OTHER PUBLICATIONS

Latta, "Laser Raster Scanner," May, 1971, pp. 3879–3880, IBM Technical Disclosure Bulletin, Vol. 13, No. 12.

*Primary Examiner*—Howard W. Britton
*Assistant Examiner*—Micahel A. Masinick

[57] ABSTRACT

A flying spot scanning system is provided by utilizing reflected light from a multifaceted rotating polygon which is then directed to the scanned medium. A light source illuminates at least one of the facets of the polygon during each scanning cycle to provide the spot scan. In each scanning cycle, information is transmitted to scanned medium by modulating the light from the light source in accordance with a video signal. To assure a uniform spot size at the scanned medium, an optical convolution of elements is selected in combination with the light source such that an adequate depth of focus at the medium is assured.

An imaging lens is provided in series with a lens, which expands an original light beam, to converge the expanded beam to illuminate the selected facet or contiguous facets that are to control the movement of a spot throughout a scan angle. In the preferred embodiment, the rotation of the polygon is synchronized in phased relation to the scan rate used to obtain the video signal.

14 Claims, 5 Drawing Figures

FLYING SPOT SCANNER

BACKGROUND OF THE INVENTION

This invention relates to a flying spot scanning system for communicating video information to a scanned medium, and more particularly to a scanning system which utilizes a multifaceted rotating polygon for controlling the scanning cycles.

Much attention has been given to various optical approaches in flying spot scanning for the purpose of imparting the information content of a modulated light beam to a scanned medium. Galvanometer arrangements have been used to scan the light across a document for recording its information content thereon. Such arrangements have included planar reflecting mirrors which are driven in an oscillatory fashion. Other approaches have made use of multifaceted mirrors which are driven continuously. Various efforts have been made to define the spot size in order to provide for an optimum utilization of the scanning system.

In copending U.S. Pat. application Ser. No. 309,859, filed on Nov. 27, 1972 and assigned to the assignee of the present invention, a flying spot scanning system is provided which does not have constraints imposed upon the spot size and other relationships of optical elements within the system which are not always desirable. As taught therein, a finite conjugate imaging system may be in convolution with the light beam and the rotating polygon. A doublet lens, in series with a convex imaging lens between the light source and the medium may provide such an arrangement.

If the imaging lens, however, is located between the doublet lens and the polygon, undesirable distortion of a modulated light beam may result at the spot of focus.

It is thus an object of the present invention to provide a flying spot scanning system which avoids such distortion effects.

It is a further object of the present invention to provide a spot scanning system which utilizes a multifaceted rotating polygon for controlling scanning cycles.

It is yet another object of the present invention of provide a spot scanning system which provides an effective uniform spot size at the contact loci of the spot with the scanned medium.

It is still another object of the present invention to provide a spot scanning system which assures a minimization of optical distortion through a predetermined synchronization of system elements.

Other objects of the invention will be evident from the description hereinafter presented.

SUMMARY OF THE INVENTION

The invention provides a flying spot scanning system which employs a multifaceted rotating polygon as the element for directing a beam of light of focus to a spot upon a medium and for enabling the spot to traverse the medium throughout a scan width. A light source, such as a laser generates a beam of light substantially orthogonal to the facets of the polygons which illuminated facets in turn reflect the impinging light beam toward the medium in successive scanning cycles. Additional optical elements are provided in convolution with the light source and the polygon to provide a desirable depth of focus of the spot and a sufficient resolution of the optical system.

A feature of the invention is that the beam of light incident upon the multifaceted polygon illuminates a given facet of the polygon during each scanning cycle to provide the desired sequence of spot scanning.

Another feature of the invention is that a very large depth of focus is provided for the spot at the contact loci at the surface of the scanned medium. This feature is provided by utilizing a finite conjugate imaging system in convolution with the light beam and the rotating polygon. A doublet lens in series with a convex imaging lens between the light source and the polygon provides such an arrangement. The doublet lens enables the original light beam to be sufficiently expanded for illuminating a given facet or contiguous facets of the polygon, whereas the imaging lens converges the expanded beam to be reflected from the polygon to focus at the contact loci on the surface of the scanned medium. Employing such an optical system assures a uniform spot size at the scanned medium even though a substantial scan width is traversed by the spot.

Still another feature of the invention is the modulation of the original light beam by means of a video signal. The information content within the video signal is thereby imparted to the light beam itself. The medium to be scanned is one which is responsive to the modulated beam and records its information content as contained within the scanning spot in a usable form on its surface across the scan width.

Yet another feature of the invention includes an embodiment of the flying spot scanning system for utilization in high speed xerography. The scanned medium in such an embodiment would consist of a xerographic drum which rotates consecutively through a charging station, an exposure station where the spot traverses the scan width of the drum, through a developing station, and a transfer station where a web of copy paper is passed in contact with the drum and receives an electrostatic discharge to induce the transfer of the developed image from the drum to the copy paper. A fusing device then fixes the images to the copy paper as it passes to an output station.

Another feature of the invention is that the video source is synchronized in a predetermined relation to the rotational velocity of the polygon.

These and other features which are considered to be characteristic of this invention are set forth with particularity in the appended claims. The invention itself, however, as well as additional objects and advantages thereof, will best be understood in the following description when considered in conjunction with the accompanying drawings.

DESCRIPTION OF THE PREFERRED EMBODIMENT

Figure 1:
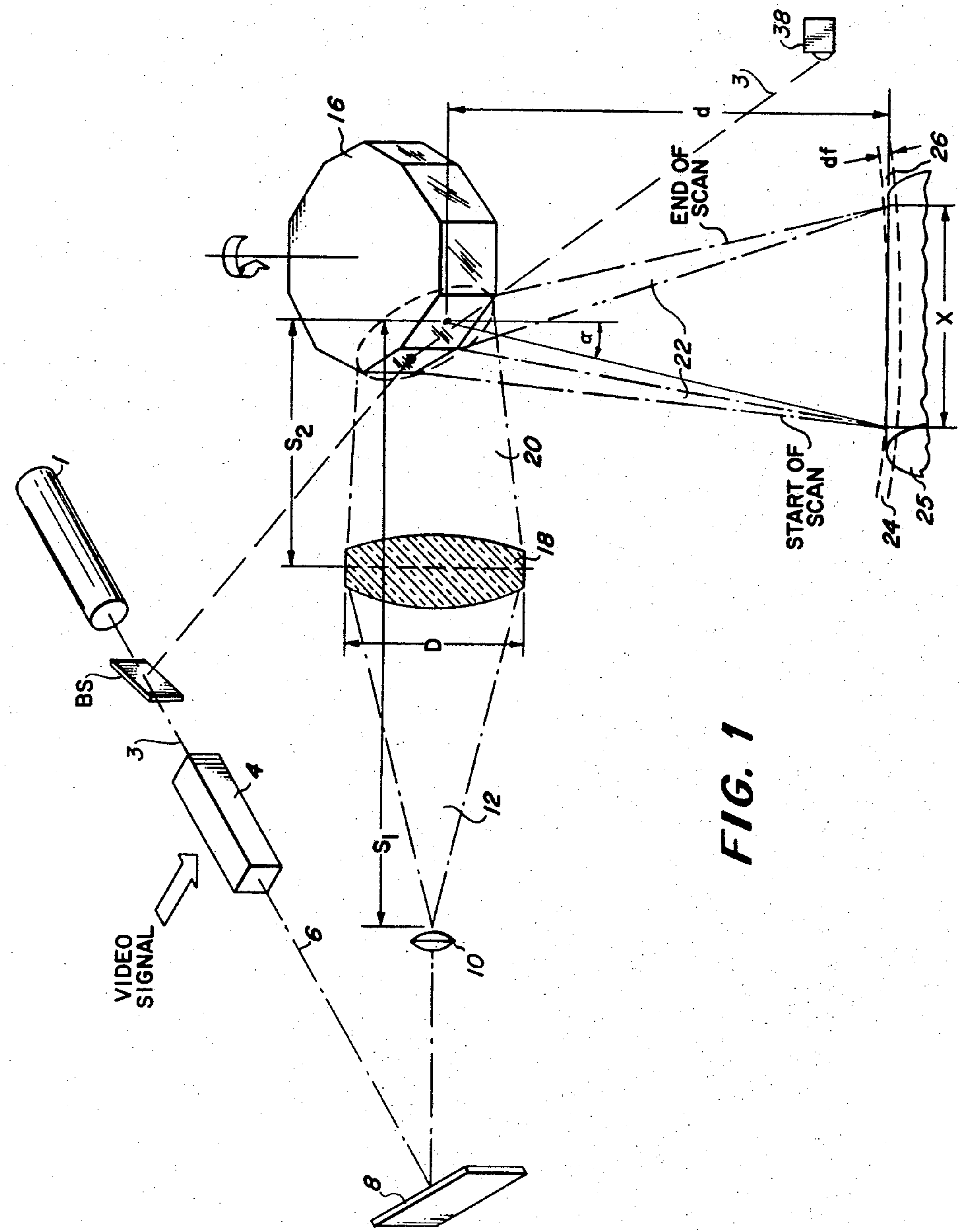
FIG. 1 is an isometric illustration of a flying spot scanning system in accordance with the invention.

In FIG. 1, an embodiment of a flying spot scanning system in accordance with the invention is shown. A light source 1 provides the original light beam for utilization by the scanning system. The light source 1 is preferably a laser which generates a collimated beam of monochromatic light which may easily be modulated by modulator 4 in conformance with the information contained in a video signal.

Modulator 4 may be any suitable electro-optical modulator for recording the video information in the form of a modulated light beam 6 at the output of the modulator 4. The modulator 4 may be, for example, a Pockel's cell comprising a potassium dihydrogen phosphate crystal, whose index of refraction is periodically varied by the application of the varying voltage which represents the video signal. The video signal may contain information either by means of binary pulse code modulation or wide-band frequency code modulation. In any event, by means of the modulator 4 the information within the video signal is represented by the modulated light beam 6.

The light beam 6 is reflected from mirror 8 in convolution with a doublet lens 10. The lens 10 may be any lens, preferably of two elements, which elements are in spaced relation to each other such that external curved surfaces are provided in symmetry with the internal surfaces. Preferably the internal surfaces of lens 10 are cemented together to form a common contact plane. of course, as is often the case in the embodiment of such a lens as a microscope objective, the elements may be fluid spaced. The lens 10 is required to image either a virtual or real axial point of beam 6 through a focal point, for example, on the opposite side of lens 10 for a real image. At the focal point, beam 6 diverges or expands to form beam 12 which would be more than sufficient to impinge upon a given facet of a scanning polygon 16.

At a distance S2 from the leading illuminated facet of polygon 16 is positioned an imaging lens 18. Lens 18 is of a diameter D to cooperate with the expanded light beam 12 to render a convergent beam 20 which illuminates the desired facets to reflect respective light beams 22 to focus to focal plane 24 at a distance *d* from the polygon 16. In this preferred embodiment, imaging lens 18 is a $1-n$ element lens. The focal length $f$ of lens 18 is related to $S_1$, $S_2$ and d by the following thin lens equation: $1/S_1 + 1/S_2 + d = 1/f$ The rotational axis of polygon 16 is orthogonal to the plane in which light beams 6 travels. The facets of the polygon 16 are mirrored surfaces for the reflection of any illuminating light impinging upon them. With the rotation of the polygon 16, assuming two contiguous facets are illuminated at a given time, a pair of light beams 22 are reflected from the respective illuminated facets and turned through a scan angle $\alpha$ for flying spot scanning. Alternatively, flying spot scanning could be provided by any other suitable device, such as mirrored piezoelectric crystals or planar reflecting mirrors which are driven in an oscillatory fashion.

In all of these arrangements, however, the reflecting surfaces would be at a distance S1 from the originating focal point of light beam 12 and in orthogonal relation to the plane bounded by the beam 6 such that the reflected beams would be in substantially the same plane as beam 6.

The focal plane 24 is proximate a recording medium 25 whose surface 26 is brought in contact with the respective focal spots of the convergent light beams throughout a scan width *x*.

A uniform spot size is assured throughout the scan width *x* even though a curved focal plane 24 is defined throughout the scanning cycle. The lens 10 in convolution with the imaging lens 18 provides a finite conjugate imaging system which allows a large depth of focus *df* which is coextensive with the contact loci of a spot throughout the scan width *x* on the surfaced 26 of the medium 25.

Figure 2:
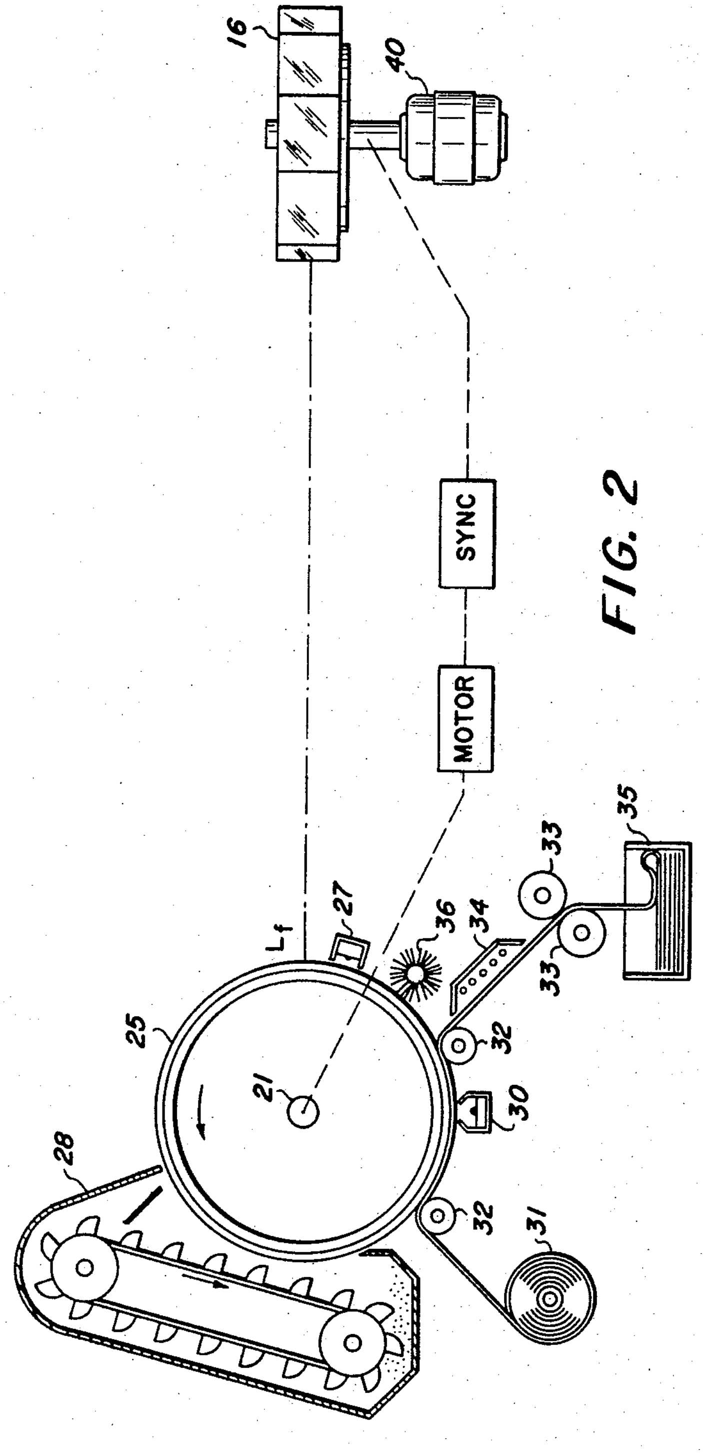
FIG. 2 is a perspective view of the utilization of the scanning beam and embodies additional features of the invention.

As shown in FIG. 2, medium 25 may be a xerographic drum which rotates consecutively through a charging station depicted by corona discharge device 27, exposure surface 26 where the beam from the rotating polygon 16 traverses the scan width *x* on the drum 25, through developing station 28 depicted by a cascade development enclosure, transfer station 30 where a web of copy paper is passed in contact with the drum 25 and receives an electrostatic discharge to induce a transfer of the developed image from the drum 25 to the copy paper. The copy paper is supplied from the supply reel 31, passes around guide rollers 32 and through drive rollers 33 into receiving bin 35. A fusing device 34 fixes the images to the copy paper as it passes to bin 35.

Usable images are provided in that the information content of the scanning spot is represented by the modulated or variant intensity of light respective to its position within the scan width *x*. As the spot traverses the charged surface 26 through a given scan angle $\alpha$, and the spot dissipates the electrostatic charge in accordance with its light intensity. The electrostatic charge pattern thus produced is developed in the developing station 28 and then transferred to the final copy paper. The xerographic drum 25 is cleaned by some cleaning device such as a rotating brush 36 before being recharged by charging device 27. In this manner, the information content of the scanned spot is recorded on a more permanent and useful medium. Of course, alternative prior art techniques may be employeed to cooperate with a scanned spot in order to utilize the information contained therein.

The polygon 16 is continuously driven at a substantially constant velocity by a motor 40. The video source is controlled so as to be synchronized with the rotation of the polygon. The rotation rate of the xerographic drum 25 determines the spacing of the scan lines. It also may be preferable to synchronize the drum 25 in some manner to the signal source of maintain image linearity. The source image is reproduced in accordance with the signal and is transferred to printout paper for use or storage.

Figure 3:
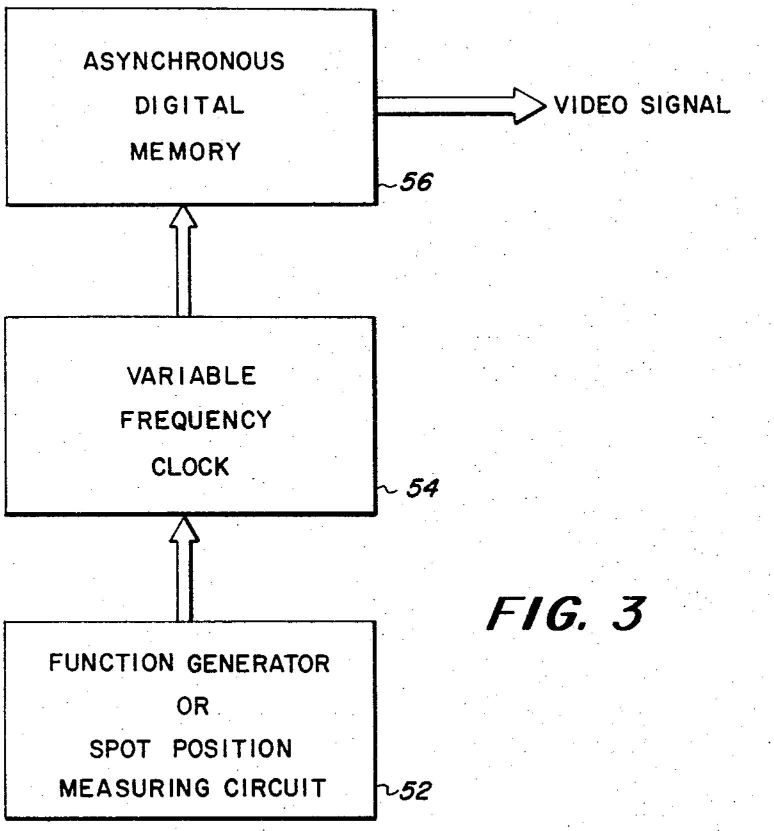
FIG. 3 is a schematic diagram of the synchronization elements in accordance with the invention.

A specific synchronization scheme is utilized to avoid the variation of the spot velocity at the focal plane 24 which would otherwise result from the convolution of optical elements configured in this embodiment. Assuming that the video signal is computer driven or buffered by an asynchronous digital device, the number of binary digits per second in the video signal transmitted to the modulator 4 could be varied. As shown in FIG. 3, a spot position measuring circuit or function generator 52 is connected in series with a variable frequency clock 54, the output of which is coupled to the digital device 56 for varying the number of bits (binary digits) per second in accordance with a predetermined function to transmit the bit stream at a given rate synchronous with the velocity of the spot. The objective is to control the video data or bit rate so as to be proportional to the spot velocity so that the resulting image on the scanned medium 25 is not distorted.

Figures 4, 5:
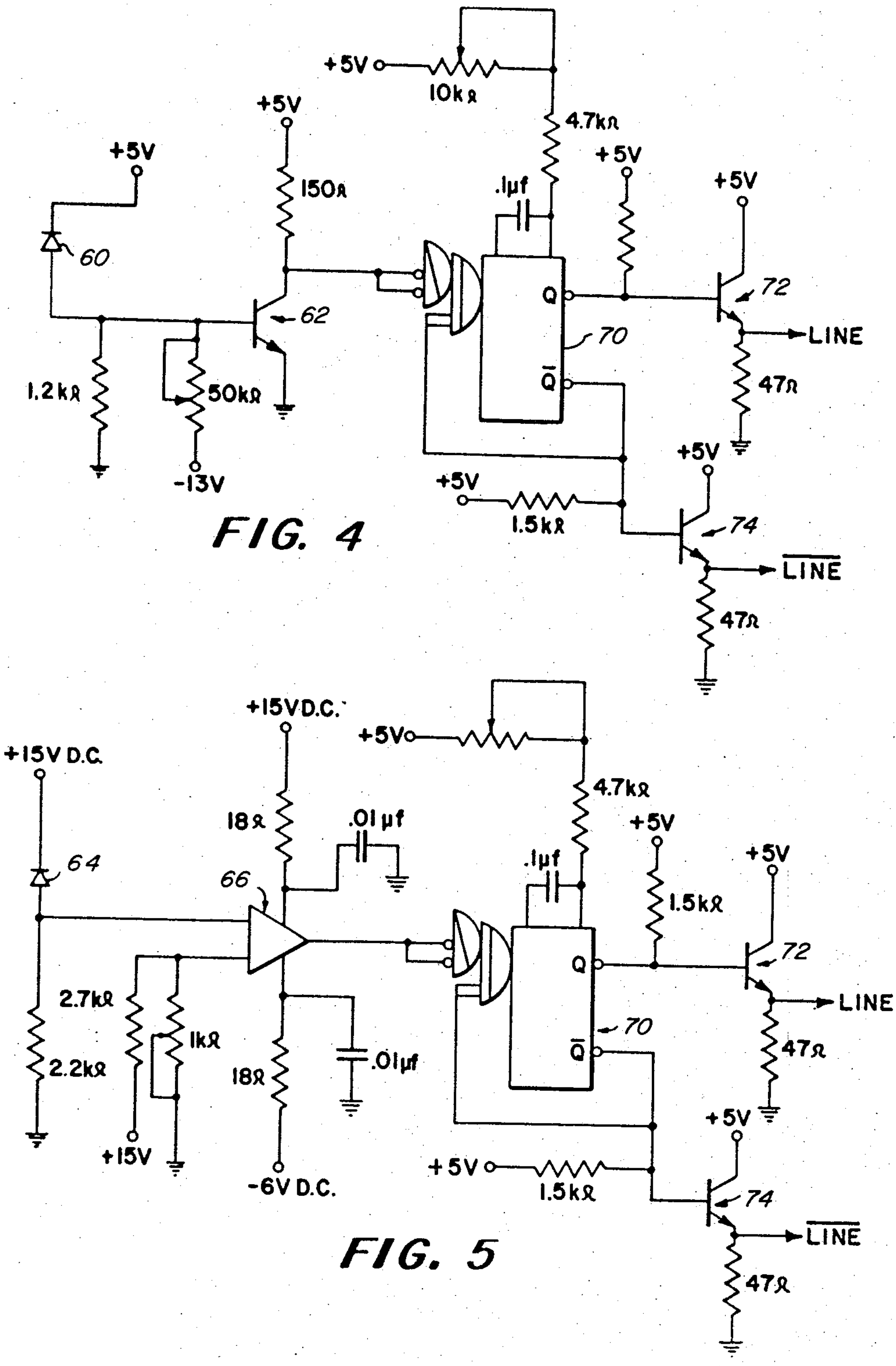
FIG. 4 is a circuit drawing of the start/stop of scan detector.
FIG. 5 is a circuit drawing of an alternate start/stop of scan detector which embodies features of the invention.

In the preferred embodiment, the function generator 52 is responsive to a detector circuit embodied in a detector 38 which detects the start of scan upon the incidence of the beam 3, directed by a beam splitter BS, as a scan line is initiated. The detector circuit of the preferred embodiment is shown in FIG. 4. The light sensitive element of the detector 38 is a photo-transistor 60. The cathode of the transistor 60 is connected to the base of an amplifier/discrimination transistor 52 and its anode is biased at +5 volts. The transistor 62 is biased slightly below its cutoff threshold by a variable resistor of 50 K ohms, connected between the base of transistor 62 and a potential of −13 volts, and a resistor of 1.2 K ohms connected between its base and ground. As the scan beam 2 illuminates the photo-transistor 60, transistor 60 conducts forcing the base of the transistor 62 from its negative potential through zero to a slightly positive value. Thus, when the transistor 60 is illuminated the transistor 62 goes from its cutoff threshold to saturation. The negative bias of the base of transistor 62, with its collector positively biased and its emitter connected to ground, provide edge discrimination and amplification of the response of the photo-transistor 60 to illumination by light.

The output from the collector of transistor 62 is connected to a monostable multivibrator 70 which is wired in a non-retriggerable mode as shown. The multivibrator 70 in this mode provides further edge discrimination. The multivibrator 70 is trimmed by a 4.7 K ohm resistor and a variable resistor of 10 K ohms connected in series to +5 volts and is timed out through a capacitor of 0.1 $\mu$f such that the pulse out of the multivibrator 70 is of a time *t* equal to the duration of one scan traverse. The outputs Q and $\overline{Q}$ are connected to the common emitter line driving transistors 72 and 74 so as to provide a high current, low impedance output of opposite polarity on respective LINE and $\overline{\text{LINE}}$ outputs. Either the LINE or $\overline{\text{LINE}}$ output is used depending upon which polarity output is desired for synchronization.

With such edge discrimination as provided by the detector circuit, reliable synchronization of the start of scan can be made with the commencement of information flow by means of the video signal. This detection of the precise start of scan gives a precise definition of the gating pulse out which measures the length of characters of information to be recorded on the medium 25 in each scan line. The leading edge of the output of the detector circuit, then, is critical in aligning the sending of information in the form of a video signal to the start of each scan. At the end of the pulse, the end of each scan is indicated. With the start of the next scan, the multivibrator 70 is reset to provide another synchronization pulse.

In FIG. 5 is shown another detector circuit. In this embodiment, the light sensitive element is a photodiode 64, which is operated in the photoconductive mode with a load resistance of 2.2 K ohms connected between its cathode and ground. The cathode of photodiode 64 is further connected to the positive input to a comparator 66, such as the differential amplifier circuit shown in FIG. 5. As the photo-diode is illuminated, a positive going pulse from 0 volts d.c. is generated for transmission to the comparator 66. The comparator 66 is adjusted to detect positive excursions from 0 volts and produce a sharp +5 volt to 0 volt pulse. The output of the comparator 66 is connected to the multivibrator and driving transistor arrangement of FIG. 4 in order to provide the necessary LINE and $\overline{\text{LINE}}$ outputs.

The output pulse from the detector circuit is a gate or enabling signal for the generator 52, such pulse having a time period equal to the time for a spot to traverse a scan line. The function generator 52 may be any of the well known generators which are capable of an output waveform of a predetermined function during this time period. An example of such a generator is that described in the *Proceedings of the IEEE*, May 1967, p. 720. The function selected is to be an approximation of the predicted variation of the spot velocity throughout a scan line. The optimum function has been determined to be $1/\text{secant}^2\ \alpha$.

Alternatively, a measuring circuit 52 could be employed to measure the position of the spot as a function of time as it moves along the scan line and generate a voltage waveform proportional to such measurement.

The clock 52 may be a voltage controlled oscillator which has an output of periodic signals to which the digital device is slaved. The output frequency of pulses from the clock 52 is dependent upon the voltage applied to it, namely the output from the generator 52. Therefore, the output frequency of the clock 52 is varied in accordance with the output waveform of generator 52. In the optimum situation the frequency is varied by $1/\text{secant}^2\ \alpha$ to so vary the video data rate of the bit stream generated from the digital device 56, which may be an asynchronous digital memory with associated drive circuitry. An example of a specific digital device 56 is the static ROM character generator column scan dot code matrix device EA4001 available from Electronic Arrays, Inc. which is fully described in the EA4001 data sheet published in November of 1970. In this manner, the video data rate is transmitted to the modulator 4 at a rate proportional to the spot velocity to avoid the possibility of image distortion.

The number of facets in this preferred embodiment has been found to be optimum if at least 20 to 30 facets are employed. The scan angle $\alpha$ traversed would be equal to the number of facets chosen in relation to one complete revolution of the polygon 16. An extremely useful arrangement would have the polygon 16 with 24 facets and a scan angle $\alpha$ of 15°. Since the depth of focus df of the converging beam 22 is related to the scan angle $\alpha$ in that as the scan angle $\alpha$ increases the radius of curvature of the focal plane 24 increases, it is important to define a scan angle $\alpha$ in relation to the desired scan width *x*. For a scan width *x* of approximately 11 inches it has been found that the scan angle $\alpha$ of 12° to 18°, with 20 to 30 facets on the polygon 16, is optimum.

Obviously, many modifications of the present invention are possible in light of the above teaching. It is therefore to be understood that, in the scope of the appended claim, the invention may be practiced other than as specifically described.

What is claimed is:

1. An electro-optical system for recording information from an electrical signal onto a scanned medium comprising:

means for providing a beam of high intensity light, means for modulating the light beam in accordance with the information content of an electrical signal comprising a bit stream, first optical means for expanding said modulated beam, second optical means in convolution with said first optical means for imaging said expanded beam to a spot in a focal plane at a predetermined distance from said second optical means, scanning means positioned between said second means and the focal plane for scanning the spot across a light sensitive medium in said focal plane to impart the information content of said spot to said medium, and electrical means for synchronizing the transmission rate of the electrical signal to the velocity of the spot across the medium, said electrical means varying the number of bits per second in accordance with a predetermined function.

2. The system as defined in claim 1 wherein the scanning means includes a multifaceted polygon having reflective sides for reflecting the light converging from said second optical means onto said medium and means for rotating said polygon such that the reflected light is scanned in successive traces across said medium.

3. The system as defined in claim 2 wherein said light source is a laser which emits a beam of collimated light of substantially uniform intensity.

4. The system as defined in claim 3 wherein said electrical means includes a function generator with an output waveform proportionate to the variation in velocity of the spot as it scans said medium, whereby the transmission rate of the electrical signal is proportionate to the velocity of the spot in each scan.

5. The system as defined in claim 4 wherein the output waveform is the function $1/\text{secant}^2 \alpha$, where $\alpha$ is the angle of scan of said beam from said polygon.

6. A flying spot scanning system for recording information from an electrical signal onto a scanned medium comprising:

means for providing a beam of high intensity light, means for modulating the light beam in accordance with the information content of an electrical signal represented by a stream of binary digits, means for focusing said modulated beam to a spot upon the surface of a light sensitive medium, scanning means positioned in the optical path of said modulated beam for scanning the spot across said medium to impart the information content of said spot to said medium, and electrical means for synchronizing the bit rate of the stream of binary digits to the velocity of the spot across the medium, said electrical means varying the number of bits per second in accordance with a predetermined function.

7. The system as defined in claim 6 wherein the scanning means includes a multifaceted polygon having reflective sides for reflecting the light incident to it onto said medium and means for rotating said polygon such that the reflected light is scanned in successive traces across said medium.

8. The system as defined in claim 7 wherein said light source is a laser which emits a beam of collimated light of substantially uniform intensity.

9. The system as defined in claim 8 wherein the bit rate of the signal is determined by means for clocking the bit stream, said clocking means having an output frequency dependent upon an input voltage for varying said bit rate.

10. The system as defined in claim 8 wherein said electrical means includes a function generator with an output waveform proportionate to the variation in velocity of the spot as it scans said medium, said output waveform being the input voltage to said clocking means, whereby said bit rate is varied proportionate to the velocity of the spot in each scan.

11. The system as defined in claim 10 wherein the output waveform is the function $1/\text{secant}^2\alpha$, where $\alpha$ is the angle of scan of said beam from said polygon.

12. A method for recording information from an electrical signal onto a scanned medium comprising the steps of:

providing a beam of high intensity light, modulating the light beam in accordance with the information content of an electrical signal represented by a stream of binary digits, focusing said modulated beam to a spot upon the surface of a light sensitive medium, scanning said spot across said medium to impart the information content of said spot to said medium, synchronizing the bit rate of the stream of binary digits to the velocity of the spot across the medium, and varying the number of bits per second in accordance with a predetermined function.

13. The method as defined in claim 12 wherein said synchronizing step includes synchronizing the bit rate from a predetermined rate in accordance with said predetermined function such that said bit rate is proportional to the velocity of said spot at any given point in a given scan.

14. The method as defined in claim 13 wherein the predetermined bit rate in said synchronizing step is varied in accordance with the function $1/\text{secant}^2\alpha$, where $\alpha$ is the scan angle.

* * * * *

UNITED STATES PATENT OFFICE

CERTIFICATE OF CORRECTION

Patent No. 3,867,571 Dated February 18, 1975

Inventor(s) Gary K. Starkweather et al

It is certified that error appears in the above-identified patent and that said Letters Patent are hereby corrected as shown below:

In column 3, line 47, change "$1/S_2 + d$" to -- $\frac{1}{S_2 + d}$ -- or -- $1/(S_2 + d)$ --.

Signed and sealed this 6th day of May 1975.

(SEAL)
Attest:

RUTH C. MASON
Attesting Officer

C. MARSHALL DANN
Commissioner of Patents
and Trademarks